United States Patent [19]

Hou

[11] Patent Number: 5,513,322

[45] Date of Patent: Apr. 30, 1996

[54] MULTI-PATH MESSAGE ROUTING WITHOUT DEADLOCKS

[75] Inventor: ChiYeh Hou, Salt Lake City, Utah

[73] Assignee: Unisys Corporation, Blue Bell, Pa.

[21] Appl. No.: 236,439

[22] Filed: May 2, 1994

[51] Int. Cl.⁶ .......................... G06F 15/80; G06F 13/14; H04B 3/02

[52] U.S. Cl. ................ 395/200.15; 395/200.02; 395/800

[58] Field of Search .............. 370/60, 60.1, 94.3; 395/200, 200.02, 200.15, 311, 312, 800; 340/825.03, 826, 827

[56] References Cited

U.S. PATENT DOCUMENTS

| | | | |
|---|---|---|---|
| 4,905,233 | 2/1990 | Cain et al. | 370/94.1 |
| 4,945,534 | 7/1990 | Driscoll et al. | 370/94.3 |
| 5,168,572 | 12/1992 | Perkins | 370/94.1 |
| 5,175,733 | 12/1992 | Nugent | 370/94.3 |
| 5,223,968 | 6/1993 | Stringer et al. | 370/60.1 |

Primary Examiner—Alyssa H. Bowler
Assistant Examiner—Mark H. Rinehart
Attorney, Agent, or Firm—Charles J. Fassbender; Mark T. Starr; Robert R. Axenfeld

[57] ABSTRACT

Messages are routed through an array of data processing nodes which are intercoupled with channels in rows and columns. Under certain conditions, a message can exit a node in either one of two directions; and this enables the message to reach its destination by multiple routes. Under other conditions, the message must exit the node in only predetermined direction, and that direction is selected to avoid message routing deadlocks.

16 Claims, 6 Drawing Sheets

30~ if(Sx=+X)(Sy=+Y), go+Y | 31a~ if(Sx=+X)(Sy=-Y), go-Y
                          | 31b~ if(Sx=-X)(Sy=-Y), go-X
                          | 31c~ if(Sx=-X)(Sy=+Y), go+Y

32~ if(Sx=-X)(Sy=+Y), go-Y | 33a~ if(Sx=+X)(Sy=+Y), go+X
                           | 33b~ if(Sx=+X)(Sy=-Y), go-Y
                           | 33c~ if(Sx=-X)(Sy=-Y), go-X

34~ if(Sx=-X)(Sy=-Y), go-Y | 35a~ if(Sx=-X)(Sy=+Y), go+Y
                           | 35b~ if(Sx=+X)(Sy=+Y), go+X
                           | 35c~ if(Sx=+X)(Sy=-Y), go-Y

36~ if(Sx=+X)(Sy=-Y), go+Y | 37a~ if(Sx=-X)(Sy=-Y), go-X
                           | 37b~ if(Sx=-X)(Sy=+Y), go+Y
                           | 37c~ if(Sx=+X)(Sy=+Y), go+X

FIG. 4

MULTI-PATH MESSAGE ROUTING WITHOUT DEADLOCKS

BACKGROUND OF THE INVENTION

This invention relates to the field of data processing; and more particularly, it relates to methods of routing messages through an array of data processing nodes such that multiple paths can be taken to reach a destination without causing message routing deadlocks to occur.

As used herein, the term data processing node is meant to include the combination of at least the following items: a microprocessor chip, a memory coupled to the microprocessor, and input-output channels to and from the microprocessor. Here, the microprocessor/memory/input-output channels can have any internal make-up.

Such a data processing node has use by itself in that the memory can store a program for the microprocessor to execute, and data can be sent to and received from the data processing node via the input-output channels. However, by intercoupling multiple data processing nodes together in an array via their input-output channels, several advantages over a single data processing node are achieved.

One advantage is that an array of nodes provides a selectable or scalable amount of computing power. To increase/decrease the computing power of the array, some nodes are simply added to/deleted from the array.

Also, another advantage is that the array of nodes provides computing power which is fail-soft. This means that one or more nodes can fail and be in need of repair, while the remaining nodes in the array continue to operate.

However, in any array of data processing nodes, an issue that needs to be addressed is how to route information in the form of messages from one node to another node. Such message routing is of course needed in order for the nodes of the array to work on data processing problems in a coordinated and cooperative fashion.

Presently in the art, Intel Corporation sells a scalable parallel processor, called the "Paragon", which comprises an array of data processing nodes that are intercoupled with channels as a "mesh". Within this mesh, the data processing nodes are arranged in rows and columns; and messages are passed from node to node along those rows and columns.

However, a major drawback with the above scalable parallel processor is that the route which each message takes from its source to its destination is fixed. Consequently, whenever the route for a message is blocked because it requires a channel that is busy, that message must wait for the channel to become available. Further, if the route for a message is blocked by a broken channel, that message will not reach its destination until the channel break is fixed.

Accordingly, a primary object of the invention is to provide an improved method of routing messages through an array of data processing nodes whereby the above drawbacks are overcome.

BRIEF SUMMARY OF THE INVENTION

With the present invention, messages are routed through an array of data processing nodes which are intercoupled with channels in rows and columns. Each message includes a header with a $S_x$ field which selects a +X or −X direction for the message to travel on the rows of channels, a $\Delta X$ field which specifies the number of nodes through which the message must pass in the direction selected by the $S_x$ field, a $S_y$ field which selects a +Y or −Y direction for the message to travel on the columns of channels, and a $\Delta Y$ field which specifies the number of nodes through which the message must pass in the direction selected by the $S_y$ field. When a message reaches a node through which it must pass, the header fields are examined to determine if $\Delta X \neq O$ and $\Delta Y \neq O$. If that condition exists, then for two combinations of the $S_x$ and $S_y$ fields, the message is passed through the node in either the direction selected by $S_x$ or the direction selected by $S_y$. For the remaining two combinations of the $S_x$ and $S_y$ fields, the message is passed through the node in a predetermined direction which is chosen such that the above variable message routing does not result in any message routing deadlock. How message routing deadlocks can occur by the variable routing, and how they are prevented, are explained in detail herein in conjunction with FIGS. 3A, 3B, and 4.

BRIEF DESCRIPTION OF THE DRAWINGS

FIG. 4 lists twelve alternative pairs of routing limitations by which the message routing deadlocks of FIGS. 3A and 3B are prevented.

DETAILED DESCRIPTION

Figure 1:
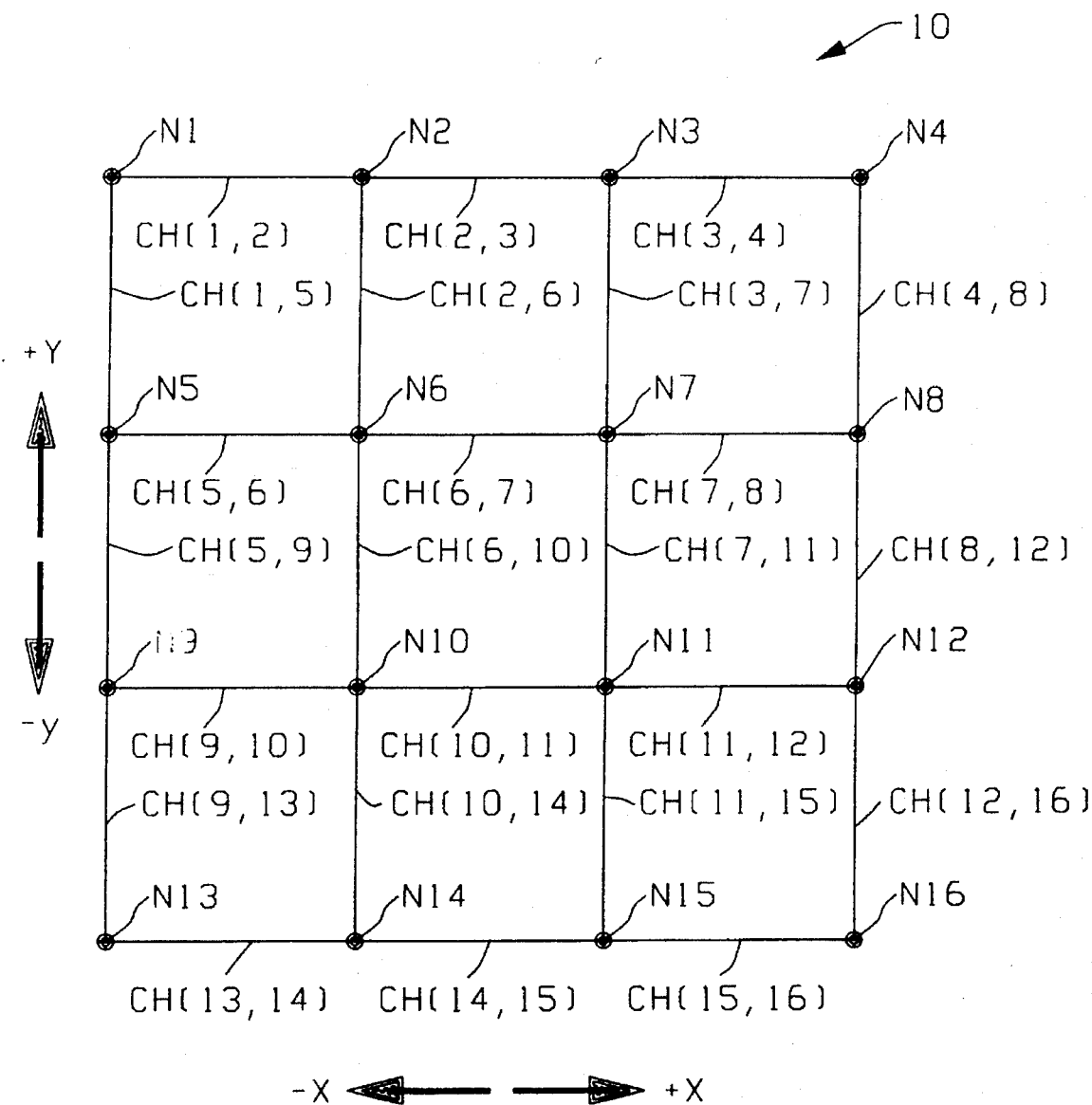
FIG. 1 shows an array of data processing nodes which are intercoupled with channels in rows and columns.

Referring now to FIG. 1, it shows an array (or mesh) 10 of data processing nodes N1–N16 through which messages are routed in accordance with the present invention. To pass those messages from one node to another, the nodes N1–N16 are intercoupled with full-duplex channels CH(1,2), CH(2,3), etc. in rows and columns.

For example, node N1 is coupled to node N2 by a full-duplex channel CH(1,2); node N2 is coupled to node N3 by a full-duplex channel CH(2,3); and node N3 is coupled to node N4 by a full-duplex channel CH(3,4). Those nodes N1, N2, N3 and N4 together with the channels CH(1,2), CH(2,3) and CH(3,4) constitute one row in the array 10.

Likewise, node N1 is coupled to node N5 by a full-duplex channel CH(1,5); node N5 is coupled to node N9 by a full-duplex channel CH(5,9); and node N9 is coupled to node N13 by a full-duplex channel CH(9,13). Those nodes N1, N5, N9 and N13 together with the channels CH(1,5), CH(5,9) and CH(9,13) constitute one column in the array 10.

All of the nodes and full-duplex channels which make up each of the rows and columns in the array 10 are identified below in Table 1.

TABLE 1

| Row | Col. | Nodes and Channels |
|-----|------|--------------------|
| 1   |      | N1, N2, N3, N4, |
|     |      | CH (1, 2), CH (2, 3), CH (3, 4) |
| 2   |      | N5, N6, N7, N8, |
|     |      | CH (5, 6), CH (6, 7), CH (7, 8) |
| 3   |      | N9, N10, N11, N12, |
|     |      | CH (9, 10), CH (10, 11), CH (11, 12) |
| 4   |      | N13, N14, N15, N16, |
|     |      | CH (13, 14), CH (14, 15), CH (15, 16) |
|     | 1    | N1, N5, N9, N13, |
|     |      | CH (1, 5), CH (5, 9), CH (9, 13) |
|     | 2    | N2, N7, N11, N15, |
|     |      | CH (3, 7), CH (7, 11), CH (11, 15) |
|     | 3    | N3, N7, N11, N15, |
|     |      | CH (3, 7), CH (7, 11), CH (11, 15) |
|     | 4    | N4, N8, N12, N16, |
|     |      | CH (4, 8), CH (8, 14), CH (12, 16) |

Each message which travels on a full-duplex channel in any row can go in either a +X direction or a −X direction; and those +X and −X directions are shown in FIG. 1. Similarly, each message which travels on a full-duplex channel in any column can go in either a +Y direction or a −Y direction; and those +Y and −Y directions are also shown in FIG. 1.

For example, a message on channel CH(10,11) which goes from node N10 to node N11, is traveling in the +X direction; whereas a message on channel CH(10,11) which goes from node N11 to node N10 is traveling in the −X direction. Similarly, a message on channel CH(3,7) which goes from node N7 to node N3 is traveling in the +Y direction; whereas a message on channel CH(3,7) which goes from node N3 to node N7 is traveling in the −Y direction.

Figure 2:
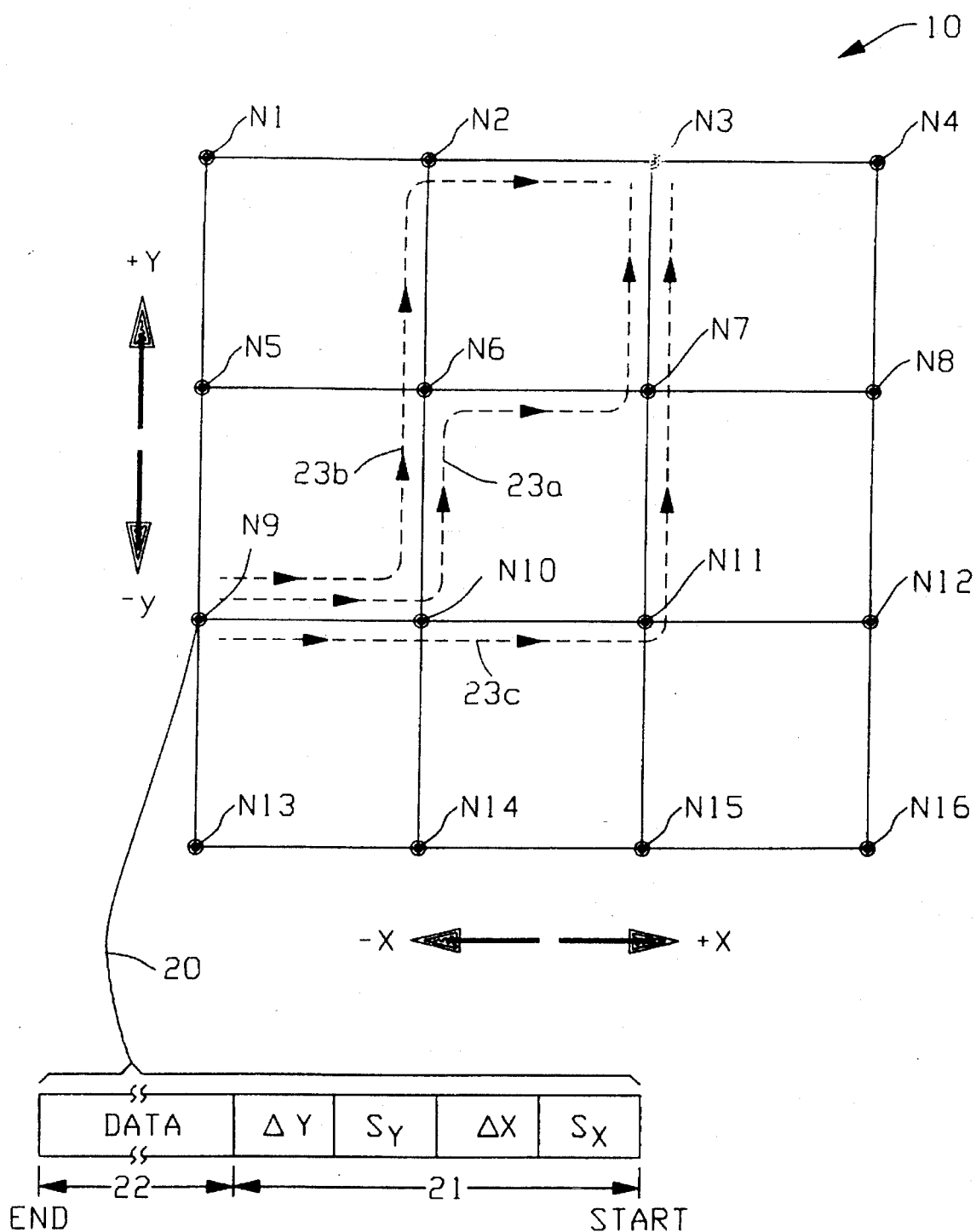
FIG. 2 shows the array of FIG. 1 together with a message format and several paths along which messages are routed in accordance with the present invention.

Each message which travels on the channels in the array 10 has a format 20 as shown in FIG. 2. That format consists of two major parts- which are a header field 21 and a data field 22. In general, the data field 22 contains information which a first node (the source node) is sending to a second node (the destination node); and the header field 21 contains information which is used to route the message from the source node to the destination node.

More specifically, the header field 21 includes a $S_x$ field, a ΔX field, a $S_y$ field, and a ΔY field. The $S_x$ field selects the +X direction or −X direction for the message to travel on the rows of the array 10; and the ΔX field specifies the number of nodes through which the message must pass in the direction selected by the $S_x$ field in order to reach the destination node. Likewise, the $S_y$ field selects the +Y direction or −Y direction for the message to travel on the columns of the array 10; and the ΔY field specifies the number of nodes through which the message must pass in the direction selected by the $S_y$ field in order to reach the destination node.

As an example of the above, consider the case where node N9 sends a message to node N3. In that particular case, if the header 21 leaves node N9 in the +X direction, then that header will be as follows: $S_x$ selects +X direction, ΔX=1, $S_y$ selects +Y direction; ΔY=2.

Now in accordance with one feature of the present invention, the above message will travel from node N10 to node N3 along any one of several different paths. One such path is indicated in FIG. 2 by reference numeral 23a; a second path is indicated by reference numeral 23b; and a third path is indicated by reference numeral 23c. Having a choice of several paths to route a message is more desirable than having just one path to route the message because the one path could be blocked by the passage of another message between another pair of nodes, or the one path could be broken.

Each time a message enters a node, that node examines the header to determine how the message should be routed. If ΔX≠0 and ΔY=0, then the header is sent out of the node on a row in either the +X direction or −X direction as specified by the $S_x$ field. If ΔX=0 AND ΔY≠0, then the header is sent out of the node on a column in either the +Y direction or −Y direction as specified by the $S_y$ field.

If Δx≠0 and ΔY≠0, then the node makes a decision, in accordance with a second feature of the present invention, to send the header out of the node on a row in a direction specified by the $S_x$ field, or on a column in a direction specified by the $S_y$ field. Exactly how this decision is made will be described shortly in conjunction with FIG. 3A, 3B, and 4.

Each time the header is sent from a node on a row, then the ΔX field is decremented by one. Similarly, each time the header is sent from a node on a column, the ΔY field is decremented by one. Thus, when a node receives a header with ΔX=0 and ΔY=0, the message is for that node.

Considering now FIGS. 3A, 3B, and 4, a preferred process by which the header is sent out of the node on either a row or column, when ΔX≠0 and ΔY≠0, will be described. To understand this process, the concept of a message routing deadlock must first be understood, and two such deadlocks are illustrated in FIG's. 3A and 3B. Specifically, FIG. 3A illustrates a counterclockwise routing deadlock, whereas FIG. 3B illustrates a clockwise routing deadlock.

Figure 3A:
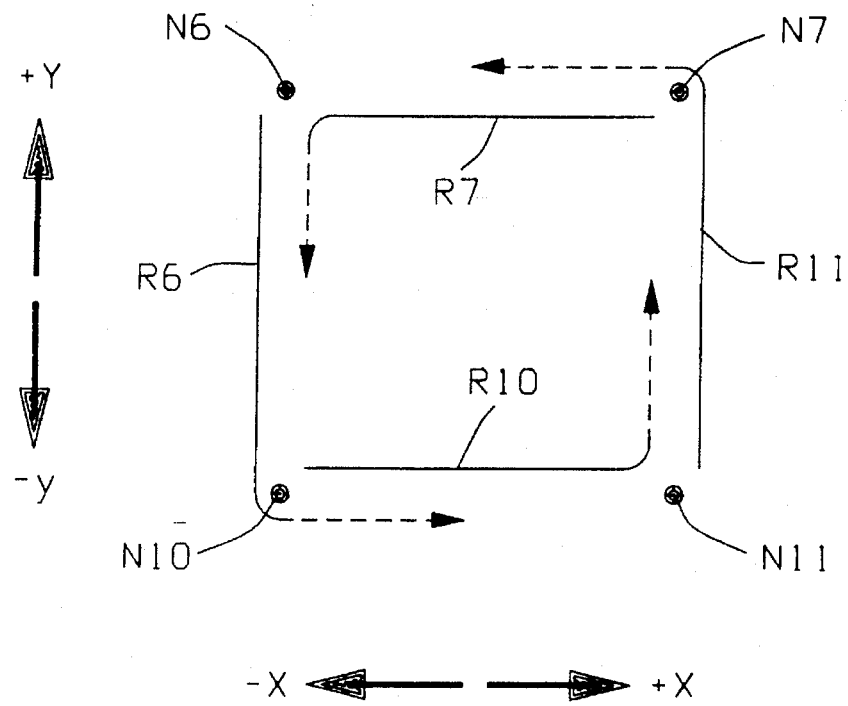
FIGS. 3A and 3B are schematic diagrams which illustrate the occurrence of two types message routing deadlocks in the array of FIG. 1.
Figure 3B:
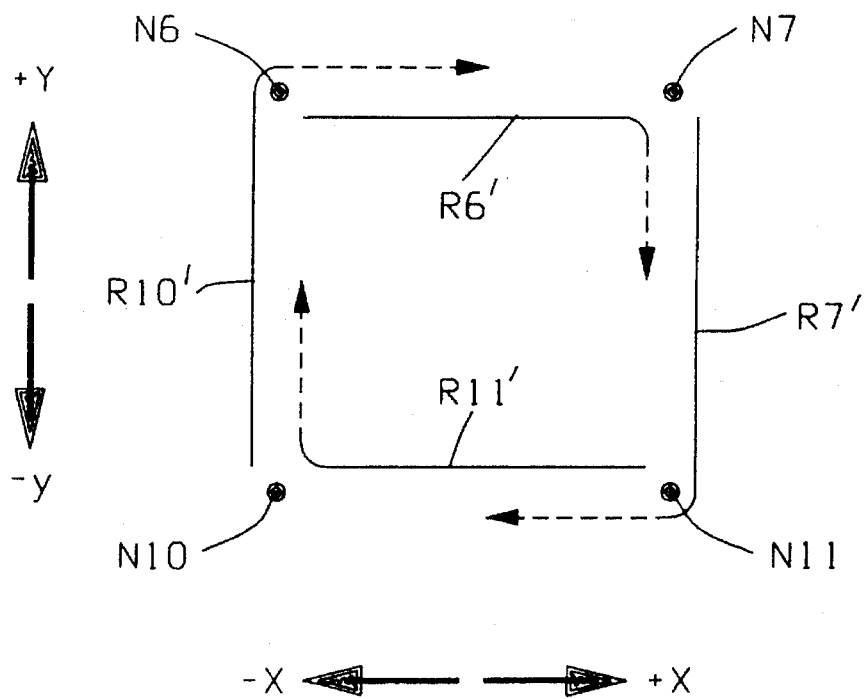

In FIG. 3A, node N6 has a message to send to node N11, and a route for that message is indicated as route R6. Similarly in FIG. 3A, node N7 has a message to send to node N10, and a route for that message is indicated as route R7; node N10 has a message to send to node N7, and a route for that message is indicated as route R10; and node N11 has a message to send to node N6, and a route for that message is indicated as route R11.

Each of the above routes R6, R7, R10 and R11 are shown partly with a solid line and partly with a dashed line. These solid lines illustrate where the messages have traveled, and these dashed lines illustrate where the messages still need to travel to reach their destination. For example, the solid line in route R6 indicates that the message from node N6 has traveled to node N10; and the dashed line in route R6 indicates that the same message still needs to travel from node N10 to node N11.

Inspection of all of FIG. 3A message routes shows that no message is able to reach its final destination. That is because the FIG. 3A message routes form a loop wherein one part of each route is blocked by one part of another route. For example, the message on route R6 can not travel from node N10 to node N11 because the message on route R10 is using the channel between nodes N10 and N11 in the +X direction.

Similarly in FIG. 3B, node N6 has a message to send to node N11, and a route for that message is indicated as route R6'; node N7 has a message to send to node N10, and a route for that message is indicated as route R7'; node N10 has a message to send to node N7, and a route for that message is indicated as route R10'; and node N11 has a message to send to node N6, and a route for that message is indicated as route R11'.

Here again, the above routes R6', R7', R10' and R11', are shown partly with a solid line which illustrates where the messages have traveled, and partly with a dashed line which illustrates where the messages still need to travel to reach their destination. Inspection of all of FIG. 3B message routes shows that no message is able to reach its final destination because those message routes form a loop wherein one part of each route is blocked by one part of another route. For example, the message on route R6' can not travel from node N7 to node N11 because the message on route R7' is using the channel between nodes N7 and N11 in the −Y direction.

Now, in accordance with the present invention, the above described message routing deadlocks of FIGS. 3A and 3B, are prevented by imposing routing limitations which are given in FIG. 4. Each of those FIG. 4 limitations apply only when a node receives a header where $\Delta X \neq 0$ and $\Delta Y \neq 0$.

To avoid the message routing deadlocks of FIGS. 3A and 3B, one pair of routing limitations in FIG. 4 must be imposed by each of the data processing nodes N1–N16. Each node N1–N16 must impose the same pair of routing limitations; and that pair can be pair #1, or pair #2, . . . or pair #12 as listed below in Table 2.

TABLE 2

| pair #1 . . . | limitations 30 and 31a |
| pair #2 . . . | limitations 30 and 31b |
| pair #3 . . . | limitations 30 and 31c |
| pair #4 . . . | limitations 32 and 33a |
| pair #5 . . . | limitations 32 and 33b |
| pair #6 . . . | limitations 32 and 33c |
| pair #7 . . . | limitations 34 and 35a |
| pair #8 . . . | limitations 34 and 35b |
| pair #9 . . . | limitations 34 and 35c |
| pair #10 . . . | limitations 36 and 37a |
| pair #11 . . . | limitations 36 and 37b |
| pair #12 . . . | limitations 36 and 37c |

According to limitation 30, if a message has a header where $S_x$ selects a +X direction and $S_y$ selects a +Y direction when $\Delta X \neq 0$ and $\Delta Y \neq 0$, then that message should be routed from each node which receives that header in the +Y direction. A message with such a header is initiated in FIG. 3A from the node N10. In FIG. 3A, however, the route R10 for the message from node N10, goes first in the +X direction and then in the +Y direction. By changing the route R10 such that the message from node N10 goes first in the +Y direction and then in the +X direction, the routing loop of FIG. 3A is broken; and that in turn eliminates the FIG. 3A counterclockwise routing deadlock.

Recall that each time a message exits a node in the +Y direction, the $\Delta Y$ field in the header is decremented by one. Thus, the $\Delta Y$ field will eventually go to zero. When $\Delta X \neq 0$ and $\Delta Y = 0$, limitation 30 will no longer apply and each node will route the message along a row in a direction selected by $S_x$.

Even when the routing limitation 30 in FIG. 4 is imposed, the clockwise routing deadlock of FIG. 3B can still occur. This is seen from FIG. 3B wherein the message which is initiated from the node N10, travels along the route R10' that goes first in the +Y direction and then in the +X direction. Consequently, to eliminate the clockwise routing deadlock of FIG. 3B, limitation 30 needs to be imposed together with a second limitation; and in FIG. 4, three alternative pairs of routing limitations are given as pair #1, #2, and #3.

Limitation 31A of pair #1 applies to messages which have a header where $S_x$ selects a +X direction and $S_y$ selects a −Y direction when $\Delta X \neq 0$ and $\Delta Y \neq 0$. In that case, limitation 31A causes each node which receives such a header to route the message in a −Y direction. For example, in FIG. 3B, the message which is initiated by node N6 along the route R6' must have a header which specifies the +X direction and the −Y direction for the message to travel; however, the message route R6' goes in the +X direction first and then in the −Y direction. Thus by imposing the limitation 31A, the message initiated by node N6 would travel first in the −Y direction to node N10 and then in the +X direction to node N11; and that would prevent the clockwise routing loop of FIG. 3B from occurring.

Similarly, limitation 31B of pair #2 also prevents the clockwise routing loop of FIG. 3B from occurring. According to limitation 31B, if a message has a header where $S_x$ specifies a −X direction and $S_y$ specifies a −Y direction when $\Delta X \neq 0$ and $\Delta Y \neq 0$, then that message should be sent from each node which receives the header in the −X direction. In FIG. 3B, the message which is initiated by node N7 must contain a header which specifies a −X direction and a −Y direction for the message to travel since the route R7' goes in both of those directions. However, the route R7' goes first in the −Y direction; and by changing the route R7' such that it goes first in the −X direction, the clockwise routing deadlock loop of FIG. 3B will not occur.

Likewise, the limitation 31C of pair #3 prevents a clockwise routing loop from occurring by limiting routes for messages with headers that specify a −X direction and a +Y direction when $\Delta X \neq 0$ and $\Delta Y \neq 0$. Those messages, according to the limitation 31C, must travel first in the +Y direction. Such a message is initiated in FIG. 3B from the node in N11 since the route R11' goes in both the −X and +Y direction. However, the route R11' goes first in the −X direction; and by changing the route R11' such that it goes first in the +Y direction, the clockwise routing loop of FIG. 3B is broken.

Except for the above limitations 30 and 31a, or 30 and 31b, or 30 and 31c, a message which has a header with $\Delta X \neq 0$ and $\Delta Y \neq 0$ can be routed in any direction as selected by the fields $S_x$ and $S_y$. For example, if the routing limitations 30 and 31a are imposed, then a message which has a header where $\Delta X \neq 0$ and $\Delta Y \neq 0$ and $S_x$ selects a −X direction and $S_y$ selects a +Y direction can be routed from a node in either the −X or +Y direction. If the channel which carries messages from the node in the +X direction is busy carrying another message, then the channel which carries messages from the node in the +Y direction can be used if it is not busy; and vice versa.

Consider now the remaining routing limitation pairs (i.e.—pairs #4–#12) of Table 2. There, each of the limitations 32, 34, and 36 prevents the counterclockwise deadlock of FIG. 3A from occurring; whereas each of the limitations 33a, 33b, 33c, 35a, 35b, 35c, 37a, 37b, and 37c prevents the clockwise deadlock. For example, the limitation 32 applies to messages with headers where $S_x$ selects a −X direction and $S_y$ selects a +Y direction when $\Delta X \neq 0$ and $\Delta Y \neq 0$. Such a message, according to the limitation 32, must be passed in the −X direction from each node which receives the header. This limitation will prevent a message from taking the route R11 in FIG. 3A, and thereby prevent a counterclockwise loop.

Likewise, the limitation 33a applies to messages with headers where $S_x$ selects a +X direction and $S_y$ selects a +Y direction when $\Delta X \neq 0$ and $\Delta Y \neq 0$. Such a message, according to the limitation 33a, must be passed in the +X direction from each node which receives the header. This limitation will prevent a message from taking the route R10' in FIG. 3B, and thereby prevent a clockwise loop.

In a generic sense, the limitations 30, 32, 34 and 36 can be restated as two process steps (1 and 2) which each node must perform in routing a message. Step 1 is to detect if $\Delta X \neq 0$ and $\Delta Y \neq 0$ and the directions selected by $S_x S_y$ equal a first predetermined pair of directions. Step 2 is to send the message through the node, when the step 1 detecting occurs, in one direction of the first predetermined pair such that it followed by the other direction of the first predetermined pair form a clockwise turn.

For example, with the limitation 36, the first predetermined pair of directions is the +X direction and the −Y direction. In that case, a message which travels in the +X direction followed by the −Y direction makes a clockwise turn, whereas a message which travels in the −Y direction followed by the +X direction makes a counterclockwise turn. Thus, the one direction of the first pair is the +X direction.

Likewise in a generic sense, the limitations 31a–31c, 33a–33c, 35a–35c, and 37a–37c can be restated as two other process steps (3 and 4) which each node must perform in routing a message. Step 3 is to detect if $\Delta X \neq 0$ and $\Delta Y \neq 0$ and the directions selected by $S_x S_y$ equal a second predetermined pair of directions. Step 4 is to send the message through the node, when the step 3 detection occurs, in the one direction of the second predetermined pair such that it followed by the other direction of the second predetermined pair form a counterclockwise turn.

For example, with the limitation 37a, the second predetermined pair of directions is the −X and the −Y direction. In that case, a message which travels in the −X direction followed by the −Y direction makes a counterclockwise turn, whereas a message which travels in the −Y direction followed by the −X direction makes a clockwise turn. Thus, the one direction of the second pair is the −X direction.

Suppose now that a node receives a message with a header where $\Delta X \neq 0$ and $\Delta Y \neq 0$ and the directions selected by $S_x S_y$ equal neither the first or second predetermined pairs of directions. In that case, the message is sent through the node, in either one of the directions selected by $S_x S_y$ based on channel availability and without regard to whether the message will make a clockwise turn or counterclockwise turn.

Figure 5:
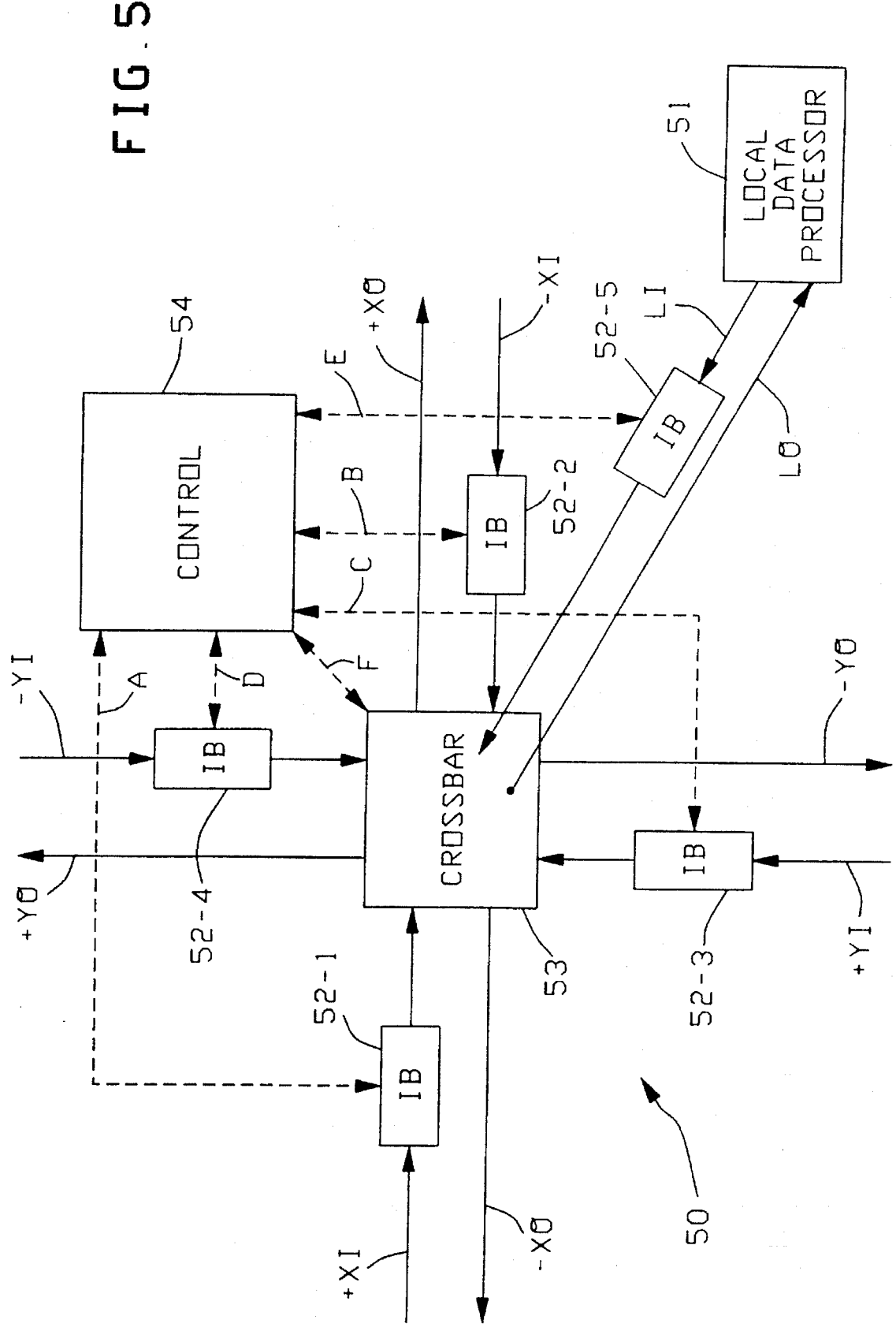
FIG. 5 shows a circuit which constitutes one preferred embodiment of each of the data processing nodes in the FIG. 1 array and by which the routing limitations of FIG. 4 are imposed.

Turning next to FIG's. 5 and 6, a preferred circuit for each of the nodes, by which they each perform the above message routing process, will be described. In FIG. 5, all of the circuitry 50 which is there shown constitutes a single node. Thus, to build the previously described sixteen node array 10 of FIG. 1, the circuit 50 is replicated sixteen times.

Included within the circuit 50 are five one-way input channels; and they are labeled +XI, −XI, +YI, −YI, and LI. Likewise included within the circuit 50 are five one-way output channels; and they are labeled +XO, −XO, +YO, −YO, and LO. A single one-way input channel plus a single one-way output channel corresponds to a single full-duplex channel in the FIG. 1 array.

Specifically the correlation between the one-way channels in the circuit 50 and the full duplex channels of FIG. 1 are as follows:

−XO and +XI=full-duplex channel on left of node,

+XO and −XI=full-duplex channel on right of node,

−YO and +YI=full-duplex channel on bottom of node,

+YO and −YI=full-duplex channel on top of node,

LO and LI=full-duplex channel internal to node.

For example, suppose the circuit 50 is used as node N6 in the FIG. 1 array 11. In that case, the channels correlate as follows:

−X0 and +XI=CH(5,6)

+X0 and −XI=CH(6,7)

−Y0 and +YI=CH(6,10)

+Y0 and −YI=CH(2,6)

Likewise, suppose the circuit 50 is used as node N13 in the FIG. 1 array. In that case, the channels correlate as follows:

channels −X0 and +XI are not used

+X0 and −XI=CH(13,14)

channels −Y0 and +YI are not used

+Y0 and −YI=CH(9,13)

Also included is the circuit 50 is a local data processing module 51 which receives messages from the one-way channel LO and which sends messages on the one-way channel LI. This data processing module 51 preferably includes a microprocessor integrated circuit chip and other supporting chips, such as a memory, which enable the microprocessor chip to receive, process, and send messages.

Further included in the circuit 50 are five input buffers 52-1, 52-2, 52-3, 52-4 and 52-5 and a five-by-five crossbar switch 53. Each of the input buffers 52-1 thru 52-5 is large enough to store the header portion 21 of one message. These buffers 52-1, 52-2, 52-3, 52-4 and 52-5 respectively pass messages from the one-way input channels +XI, −XI, +YI, −YI and LI to the crossbar 53. Then the crossbar 53 passes the messages to respective one-way output channels +XO, −XO, +YO, −YO, and LO.

In order to control which buffers 52-1 thru 52-5 and which one-way output channels get intercoupled, the circuit 50 also includes a control module 54. One respective set A, B, C, D, E of control signals is sent between the control module 54 and each of the input buffers 52-1, 52-2, 52-3, 52-4 and 52-5; and another set F of control signals is sent between the control module 54 and the crossbar 53. These signal sets A–F are shown in detail in FIG. 6 together with a preferred internal structure for the control module 54.

Figure 6:
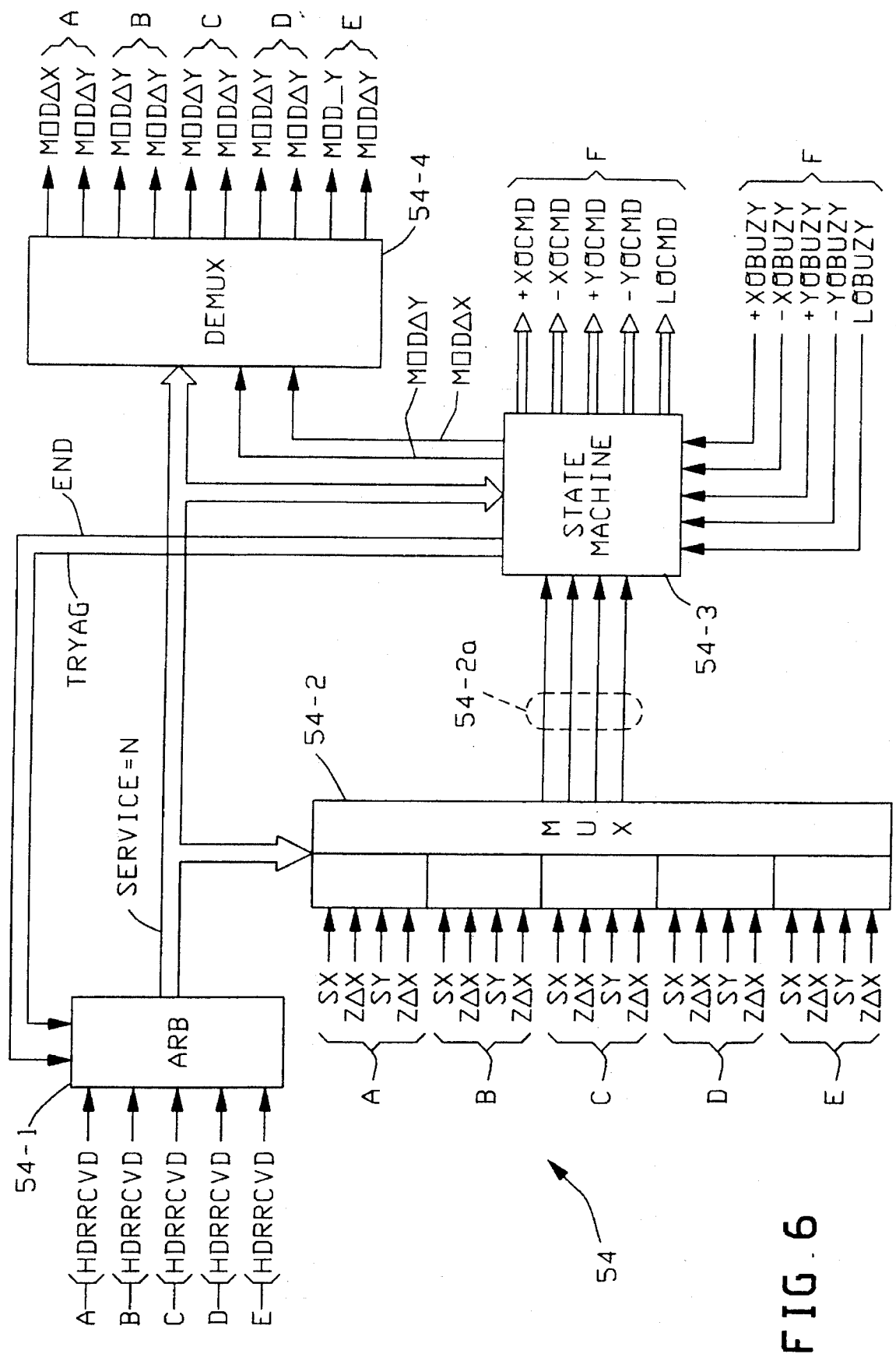
FIG. 6 shows additional details of the internal structure of a control module which lies within the FIG. 5 data processing node.

Inspection of FIG. 6 shows that each of the input buffers sends a signal HDRCVD to an arbiter circuit 54-1. When buffer 52-1 receives the header of a message, the HDRCVD signal in the signal set A goes true. Likewise, when buffer 52-2 receives the header of a message, the HDRCVD signal in the signal set B goes true; etc.

Within the arbiter 54-1, the true HDRCVD signals are selected one at a time. If the HDRCVD signal from buffer 52-1 is selected, then the arbiter 54-1 generates an output signal of SERVICE=I. Likewise, if the HDRCVD signal from buffer 52-2 is selected, then the arbiter generates an output signal of SERVICE=2; etc. These service signal are indicated in FIG. 6b as SERVICE=N.

From the arbiter 54-1, the SERVICE=N signals are sent to the a multiplexor 54-2. Then, in response to the SERVICE=1 signal, the multiplexor passes four signals, $S_x$, $Z\Delta X$, $S_y$, $Z\Delta Y$ from buffer 52-1 to the multiplexor output 54-2a. Likewise, in response to the SERVICE=2 signal, the multiplexor passes four signals $S_x$, $Z\Delta X$, $S_y$, $Z\Delta Y$ from buffer 52-2 to the multiplexor output 54-2a, etc.

Signal $S_x$ is true if the header in the selected input buffer specifies a +X direction for the message; and signal $Z\Delta X$ is true if the $\Delta X$ field has zero magnitude. Likewise, signal $S_y$ is true if the header in the selected input buffer specifies a +Y direction for the message; and signal $Z\Delta Y$ is true if the $\Delta Y$ field has zero magnitude.

All of the signals from the multiplexor output 54-2a are sent to a state machine 54-3. Also, the state machine 54-3 receives the SERVICE=N signals from the arbiter 54-1, and it receives five other signals as part of the signal set F from the crossbar 53. These five signals are +XOBUSY, −XOBUSY, +YOBUSY, −YOBUSY, LOBUSY.

A true +XOBUSY signal indicates that the one-way output channel +XO is busy carrying a message from one of the input buffers, and thus it is not available to carry another message from a different input buffer. Likewise, a true −XOBUSY signal indicates that the one-way output channel −XO is busy carrying a message from one of the input buffers, and thus it is not available to carry another message from a different buffer; etc.

Based on all of the signals which the state machine 54-3 receives, the state machine generates five sets of commands to the crossbar 53; and those five command sets are shown in FIG. 6 as +XOCMD, −XOCMD, +YOCMD, −YOCMD, and LOCMD. In response to the −XOCMD, the crossbar 53 couples the output of one of the buffers 51-1 thru 52-5 to the +XO one-way output channel. Likewise, in response to the −XOCMD, the crossbar 53 couples the output of one of the buffers to the −XO one-way channel; etc.

Each of the above five command sets are generated by the state machine 54-3 in accordance with one of the previously described pairs of message routing limitations as given in FIG. 4. For example, consider the case where the pair of routing limitations 30 and 31a are imposed; and further in that case, assume $S_x$=true, ZΔX=false, $S_y$=true, ZΔY=false, and +YOBUSY=false. Then in that case, the state machine 54-3 will generate a +YOCMD which directs the crossbar to pass the output of buffer 52-1 to the +YO output channel. If, however, +YOBUSY=true, then no new +YOCMD is generated.

Likewise, assume the routing limitations 30 and 31a are again imposed; and further assume $S_x$=true, ZΔX=false, $S_y$=false, ZΔY=false, and −YOBUSY=false. Then in that case, the state machine 54-3 will generate a −YOCMD directs the crossbar to pass the output of buffer 52-1 to the −YO output channel. Here again, if −YOBUSY=true, then no −YOCMD is generated.

Similarly, assume the routing limitations 30 and 31a are again imposed; and further assume $S_x$=false, ZΔX=false, $S_y$=true, ZΔY=false, −XOBUSY=false, and +YOBUSY=false. Then in that case, the state machine 54-3 will generate either an −XOCMD or a +YOCMD which respectively direct the crossbar to pass the output of buffer 52-1 to the +XO or +YO output channel.

In the above case where the state machine 54-3 has to chose one of two commands to generate, that choice in a first embodiment is made on a random fashion. In a second embodiment, the choice is made on an alternating basis. Further is a third embodiment, the choice is made by pre-assigning priorities to the output channels.

If the state machine 54-3 generates one of the commands +XOCMD or −XOCMD, that state machine then sends a MODΔX pulse to a demultiplexer 54-4. At the same time, the demultiplexer receives the SERVICE=N signals from the arbiter 54-1; and in response, the demultiplexer passes the MODΔX pulse to the particular input buffer which the SERVICE=N signals select. For example, if SERVICE=1 is true, the MODΔX pulse is sent to buffer 52-1. Then in the input buffer which receives the MODΔX pulse, the ΔX field is decremented by one.

Similarly, if the state machine 54-3 generates one of the commands +YOCMD or −YOCMD, that state machine then sends a MODΔY pulse to the demultiplexer 54-41. In turn, the MODΔY pulse is passed by the demultiplexer to the particular input buffer which the SERVICE=N signals select; and that input buffer then decrements the ΔY field by one.

Lastly, the state machine 54-3 sends either an END signal or a TRYAG signal to the arbiter 54-1. If the state machine 54-3 selected an output channel from the crossbar 53 which was not busy, then the END signal is sent; otherwise the TRYAG signal is sent. In response to both the END signal and TRYAG signal, the arbiter 54-1 reselects one of the true HDRRCVD signals and all of the above described operations by the FIG. 6 circuit are repeated. However, if the END signal was sent, the arbiter 54-1 disregards the HDRRCUD signal that was last selected until it switches from a false state to a true state, which indicates that a new header has been received.

From the above description of FIGS. 5 and 6, it should be evident that the data processing module 51 in any one node can send a message to the data processing module 51 in any other node simply by loading the message with a proper header into the input buffer 52-5. Note that when this header is loaded into the buffer 52-5, the ΔX and ΔY fields must account for the passage of the message from the buffer 52-5 through the crossbar 53 to one of the output channels +XO, −XO, +YO, or −YO.

For example, recall that is the description of FIG. 2, a message was sent from node N9 to node N3, and that message was described as leaving node N9 in the +X direction with a header of Sx=+X, ΔX=1, Sy=+Y, ΔY=2. However, within node N9, the header would be loaded into buffer 52-5 by the data processor 51 with fields of $S_x$=+X, ΔX=2, $S_y$=+Y, ΔY=2.

Thereafter the arbiter 54-1 will select the local input bus LI for service; and then the state machine 54-3 will determine whether to send the header out of the crossbar 52 in +X direction or the +Y direction. This choice will be made in accordance with one pair of message routing limitations from FIG. 4. If the +Y direction is selected, the message will leave node N9 with header fields of $S_x$=+x, ΔX=2, $S_y$=+Y, ΔY=1.

One preferred method of routing messages through an array of data processing nodes, as well as one preferred structure for each node, has now been described in detail. In addition, however, various changes and modifications can be made to those details without departing from the nature and spirit of the invention.

In particular in FIG. 5, the input buffers 52-1 thru 52-5 can be made of any type of flip-flops; the crossbar 53 can be made of any type of logic gates; and any type of microprocessor chip can be used for the data processor 51. Likewise, in FIG. 6, any type of logic gates and flip-flops can be used to construct the arbiter 54-1, the multiplexor 54-2, the state machine 54-3, and the demultiplexer 54-4.

Accordingly, it is to be understood that the invention is not limited to the details of any one particular preferred embodiment but is defined by the appended claims.

What is claimed is:

1. A method of routing a message through an array of data processing nodes which are intercoupled with channels in rows and columns; said message including a header with a $S_x$ field which selects a +X or −X direction for said message to travel on said rows of channels, a ΔX field which specifies the number of nodes through which said message must pass in the direction selected by said $S_x$ field, a $S_y$ field which selects a +Y or −Y direction for said message to travel on said columns of channels, and a ΔY field which specifies the number of nodes through which said message must pass in the direction selected by said $S_y$ field; said method being performed by a node which receives said header and including the steps of:

examining said header for a first state wherein ΔX≠0 and ΔY≠0 and $S_x S_y$ select a first predetermined pair of directions;

sending said message through said node, if said first state exists, on just a single channel in the one direction of said first pair such that it followed by the other direction of said first pair form a clockwise turn;

examining said header for a second state wherein $\Delta X \neq 0$ and $\Delta Y \neq 0$ and $S_x S_y$ select a second predetermined pair of directions;

sending said message through said node, if said second state exists, on just a single channel in the one direction of said second pair such that it followed by the other direction of said second pair form a counterclockwise turn;

examining said header for a third state wherein $\Delta X \neq 0$ and $\Delta Y \neq 0$ and $S_x S_y$ select neither said first or second predetermined pairs of directions; and, sending said message through said node, if said third state exists, on just a single channel in either one of the directions selected by $S_x$ $S_y$ based on channel availability and without regard to whether said message will make a clockwise turn or counterclockwise turn.

2. A method according to claim 1 wherein said first predetermined pair of directions is +X+Y and said second predetermined pair of directions is +X−Y.

3. A method according to claim 1 wherein said first predetermined pair of directions is +X+Y and said second predetermined pair of directions is −X−Y.

4. A method according to claim 1 wherein said first predetermined pair of directions is +X+Y and said second predetermined pair of directions is −X+Y.

5. A method according to claim 1 wherein said first predetermined pair of directions is −X+Y and said second predetermined pair of directions is +X+Y.

6. A method according to claim 1 wherein said first predetermined pair of directions is −X+Y and said second predetermined pair of directions is +X−Y.

7. A method according to claim 1 wherein said first predetermined pair of directions is −X+Y and said second predetermined pair of directions is −X−Y.

8. A method according to claim 1 wherein said first predetermined pair of directions is −X−Y and said second predetermined pair of directions is −X+Y.

9. A method according to claim 1 wherein said first predetermined pair of directions is −X−Y and said second predetermined pair of directions is +X+Y.

10. A method according to claim 1 wherein said first predetermined pair of directions is −X−Y and said second predetermined pair of directions is +X−Y.

11. A method according to claim 1 wherein said first predetermined pair of directions is +X−Y and said second predetermined pair of directions is −X−Y.

12. A method according to claim 1 wherein said first predetermined pair of directions is +X−Y and said second predetermined pair of directions is −X+Y.

13. A method according to claim 1 wherein said first predetermined pair of directions is +X−Y and said second predetermined pair of directions is +X+Y.

14. A method according to claim 1 wherein, if said third state exists and two channels are available for sending said message in the directions selected by $S_x$ and $S_y$, then the one direction in which said message is sent through said node is selected randomly.

15. A method according to claim 1 wherein, if said third state exists and two channels are available for sending said message in the directions selected by $S_x$ and $S_y$, then the one direction in which said message is sent through said node is selected in an alternating fashion.

16. A method according to claim 1 wherein, if said third state exists and two channels are available for sending said message in the directions selected by $S_x$ and $S_y$, then the one direction in which said message is sent through said node is selected based on pre-assigned priorities.

\* \* \* \* \*